(12) United States Patent
Cummings et al.

(10) Patent No.: US 11,683,090 B1
(45) Date of Patent: Jun. 20, 2023

(54) LASER-BASED ENHANCEMENT OF SIGNAL PROPAGATION PATH FOR MOBILE COMMUNICATIONS

(71) Applicant: T-Mobile USA, Inc., Bellevue, WA (US)

(72) Inventors: George Cummings, Gilbert, AZ (US); Brett Christian, Independence, MO (US); Scott Probasco, Bedford, TX (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/577,795

(22) Filed: Jan. 18, 2022

(51) Int. Cl.
| | |
|---|---|
| *H04B 10/07* | (2013.01) |
| *H04B 17/391* | (2015.01) |
| *H04B 17/318* | (2015.01) |
| *H04B 17/336* | (2015.01) |
| *H04B 7/0426* | (2017.01) |
| *H04B 17/26* | (2015.01) |
| *H04B 10/50* | (2013.01) |

(52) U.S. Cl.
CPC .......... *H04B 10/07* (2013.01); *H04B 7/043* (2013.01); *H04B 17/26* (2015.01); *H04B 17/318* (2015.01); *H04B 17/336* (2015.01); *H04B 17/3913* (2015.01); *H04B 10/503* (2013.01)

(58) Field of Classification Search
CPC ........ H04B 10/07; H04B 7/043; H04B 17/26; H04B 17/318; H04B 17/336; H04B 17/3913; H04B 10/503

USPC .......................................................... 398/25
See application file for complete search history.

(56) References Cited

U.S. PATENT DOCUMENTS

| | | |
|---|---|---|
| 5,497,386 A | 3/1996 | Fontana |
| 5,551,624 A | 9/1996 | Horstein et al. |
| 5,557,347 A | 9/1996 | Johnson |
| 5,761,234 A | 6/1998 | Craig et al. |
| 5,878,328 A | 3/1999 | Chawla et al. |
| 6,188,913 B1 | 2/2001 | Fukagawa et al. |
| 6,408,189 B1 | 6/2002 | Nakamura et al. |
| 6,665,322 B2 | 12/2003 | Woodley |
| 7,065,368 B2 | 6/2006 | You et al. |
| 7,079,844 B2 | 7/2006 | Furukawa et al. |

(Continued)

FOREIGN PATENT DOCUMENTS

| | | |
|---|---|---|
| CN | 101282563 B | 2/2012 |
| CN | 102932739 B | 7/2015 |

(Continued)

*Primary Examiner* — Don N Vo
(74) *Attorney, Agent, or Firm* — Perkins Coie LLP

(57) ABSTRACT

A system uses pulsed lasers to enhance a signal propagation path in a telecommunications network. The system can estimate a signal propagation path, which varies based on a current location of a mobile device relative to a base station. The system can detect a propagation loss due to a condition of a propagation medium including the signal propagation path and determine whether the mobile device is in Line-of-Sight (LOS) of a laser emitter. In response to detection of the propagation loss, the laser emitter can emit a pulsed laser that can enhance signal propagation by mitigating the propagation loss on the signal propagation path. The pulsed laser has a propagation path overlapping the signal propagation path when the mobile device is in LOS of the laser emitter, which is mounted on the base station.

20 Claims, 5 Drawing Sheets

(56) References Cited

U.S. PATENT DOCUMENTS

| | | |
|---|---|---|
| 7,508,868 B2 | 3/2009 | Chang |
| 7,689,240 B2 | 3/2010 | Anderson |
| 8,098,367 B2 | 1/2012 | Kirk et al. |
| 8,213,978 B1 | 7/2012 | Ho et al. |
| 8,219,094 B2 | 7/2012 | Huber et al. |
| 8,340,684 B2 | 12/2012 | Miura |
| 8,346,205 B2 | 1/2013 | Dehner et al. |
| 8,367,991 B2 | 2/2013 | Bradley |
| 8,369,870 B2 | 2/2013 | Macdonald et al. |
| 8,385,908 B2 | 2/2013 | Alvarez et al. |
| 8,385,911 B1 | 2/2013 | Vallette |
| 8,396,482 B1 | 3/2013 | Kalliojarvi |
| 8,442,538 B2 | 5/2013 | Segall et al. |
| 8,483,719 B2 | 7/2013 | Eitan et al. |
| 8,674,871 B2 | 3/2014 | Denis et al. |
| 8,853,604 B1 | 10/2014 | Barchers |
| 9,318,799 B2 | 4/2016 | Rousu et al. |
| 9,351,172 B2 | 5/2016 | Thiel et al. |
| 9,485,706 B2 | 11/2016 | Shinada et al. |
| 9,518,822 B2 | 12/2016 | Maynard |
| 9,527,159 B2 | 12/2016 | Frankel et al. |
| 9,661,581 B2 | 5/2017 | Soldati et al. |
| 9,664,773 B2 | 5/2017 | Kudekar et al. |
| 9,706,358 B2 | 7/2017 | Sen et al. |
| 9,729,197 B2 | 8/2017 | Gross et al. |
| 9,768,833 B2 | 9/2017 | Fuchs et al. |
| 9,781,685 B2 | 10/2017 | Tsui et al. |
| 9,820,232 B2 | 11/2017 | Zappi et al. |
| 9,880,259 B2 | 1/2018 | Ramlall |
| 9,906,269 B2 | 2/2018 | Fuchs et al. |
| 9,971,016 B2 | 5/2018 | Kwak et al. |
| 10,012,474 B2 | 7/2018 | Teetzel et al. |
| 10,061,027 B2 | 8/2018 | Goldberg et al. |
| 10,136,263 B2 | 11/2018 | Nakata |
| 10,222,204 B2 | 3/2019 | Yahng et al. |
| 10,225,816 B2 | 3/2019 | Meredith et al. |
| 10,284,316 B2 | 5/2019 | Zhihua et al. |
| 10,292,076 B2 | 5/2019 | Alriksson et al. |
| 10,355,745 B2 | 7/2019 | Henry et al. |
| 10,517,124 B2 | 12/2019 | Balappanavar et al. |
| 10,555,318 B2 | 2/2020 | Willis et al. |
| 11,032,792 B2 | 6/2021 | Opshaug et al. |
| 11,044,402 B1 | 6/2021 | Rydberg |
| 11,095,362 B2 | 8/2021 | Guha et al. |
| 2002/0109887 A1* | 8/2002 | Aburakawa ........ H04B 10/1125 398/131 |
| 2002/0149811 A1* | 10/2002 | Willebrand ............ H04B 10/07 398/118 |
| 2009/0088180 A1 | 4/2009 | Lamance et al. |
| 2009/0161611 A1 | 6/2009 | Kuroda |
| 2010/0081458 A1 | 4/2010 | Sheynblat et al. |
| 2012/0101658 A1 | 4/2012 | Bradley et al. |
| 2015/0163624 A1 | 6/2015 | Kreher et al. |
| 2016/0056525 A1 | 2/2016 | Hansryd et al. |
| 2017/0079007 A1 | 3/2017 | Carbajal |
| 2019/0074597 A1* | 3/2019 | Vannucci ............... H04B 10/90 |
| 2020/0195449 A1 | 6/2020 | Obaidi |
| 2021/0036792 A1 | 2/2021 | Torrico |
| 2021/0126695 A1 | 4/2021 | Xin et al. |
| 2021/0239801 A1 | 8/2021 | Liu et al. |
| 2021/0250778 A1 | 8/2021 | Tsutsui |
| 2022/0116111 A1* | 4/2022 | Zhang .................. H04M 1/737 |
| 2022/0407583 A1* | 12/2022 | Raghavan ............ H04B 7/0695 |

FOREIGN PATENT DOCUMENTS

| | | |
|---|---|---|
| CN | 103576134 B | 10/2015 |
| CN | 105223584 B | 11/2017 |
| CN | 108267509 A | 7/2018 |
| CN | 111157617 A | 5/2020 |
| CN | 113078973 A | 7/2021 |
| EP | 0554197 B1 | 10/1996 |
| EP | 1067528 A2 | 1/2001 |
| EP | 2748956 A1 | 7/2014 |
| EP | 3173781 A1 | 5/2017 |
| EP | 3240494 A1 | 11/2017 |
| EP | 3240603 B1 | 5/2019 |
| EP | 3404361 B1 | 7/2019 |
| JP | H09153867 A | 6/1997 |
| JP | 4071660 B2 | 1/2008 |
| JP | 2010041377 A | 2/2010 |
| JP | 4528930 B2 | 6/2010 |
| JP | 6142451 B2 | 5/2017 |
| JP | 6642352 B2 | 2/2020 |
| KR | 20060039581 A | 5/2006 |
| KR | 20100050895 A | 5/2010 |
| KR | 20110008962 A | 1/2011 |
| KR | 101339192 B1 | 12/2013 |
| WO | 03023443 A2 | 3/2003 |
| WO | 2011047709 A1 | 4/2011 |
| WO | 2012071796 A1 | 6/2012 |
| WO | 2012143952 A2 | 10/2012 |
| WO | 2014027738 A1 | 2/2014 |
| WO | 2014199323 A2 | 12/2014 |
| WO | 2015014129 A1 | 2/2015 |
| WO | 2017149526 A2 | 9/2017 |
| WO | 2017185555 A1 | 11/2017 |
| WO | 2017197776 A1 | 11/2017 |
| WO | 2018019394 A1 | 2/2018 |
| WO | 2019127046 A1 | 7/2019 |
| WO | 2020095057 A1 | 5/2020 |
| WO | 2020243680 A1 | 12/2020 |
| WO | 2021016561 A1 | 1/2021 |

* cited by examiner

LASER-BASED ENHANCEMENT OF SIGNAL PROPAGATION PATH FOR MOBILE COMMUNICATIONS

BACKGROUND

In a mobile communications system, there are numerous factors that can affect signal propagation. Signal path loss ("path loss"), or signal path attenuation, refers to the reduction in power density of an electromagnetic wave as it propagates through space. Path loss is a major component in the analysis and design of a telecommunications system. This term is commonly used in wireless communications. Path loss may be due to many effects, such as free-space loss, refraction, diffraction, reflection, aperture-medium coupling loss, and absorption. Path loss is also influenced by terrain contours, environment (e.g., urban or rural, vegetation and foliage), propagation medium (e.g., dry or moist air), the distance between the transmitter and the receiver, and the height and location of antennas.

A distance and direction of a mobile device relative to a cellular tower is an example of one factor that contributes to path loss because signal propagation through the air is subject to reflections, and the signal from the transmitter to the receiver can travel different distances. As such, the same signal can reach the receiver with different strengths and delays in time. The mobile device must be within a threshold range of the tower and the threshold range can vary depending on the transmission power of the tower as well as the transmission power of the mobile device. As a result, different mobile devices can have vastly different connection qualities.

The geography can affect coverage because a signal that has a direct Line-of-Sight (LOS) with a cell tower will be stronger than a signal obstructed by mountains, buildings, trees, etc. Even the time of year can affect signal propagation. For example, in summer, there can be more foliage on trees than in winter, which can decrease signal strength. Some materials allow signals to pass through while others impede signals greatly. Factors such as wind direction, terrain type, atmospheric conditions, cloud cover, man-made obstacles, and dense trees can also affect signal propagation. In addition, radio signals repeatedly bouncing off obstacles create multiple paths, decreasing mobile coverage.

BRIEF DESCRIPTION OF THE DRAWINGS

Detailed descriptions of implementations of the present invention will be described and explained through the use of the accompanying drawings.

Figure 1:
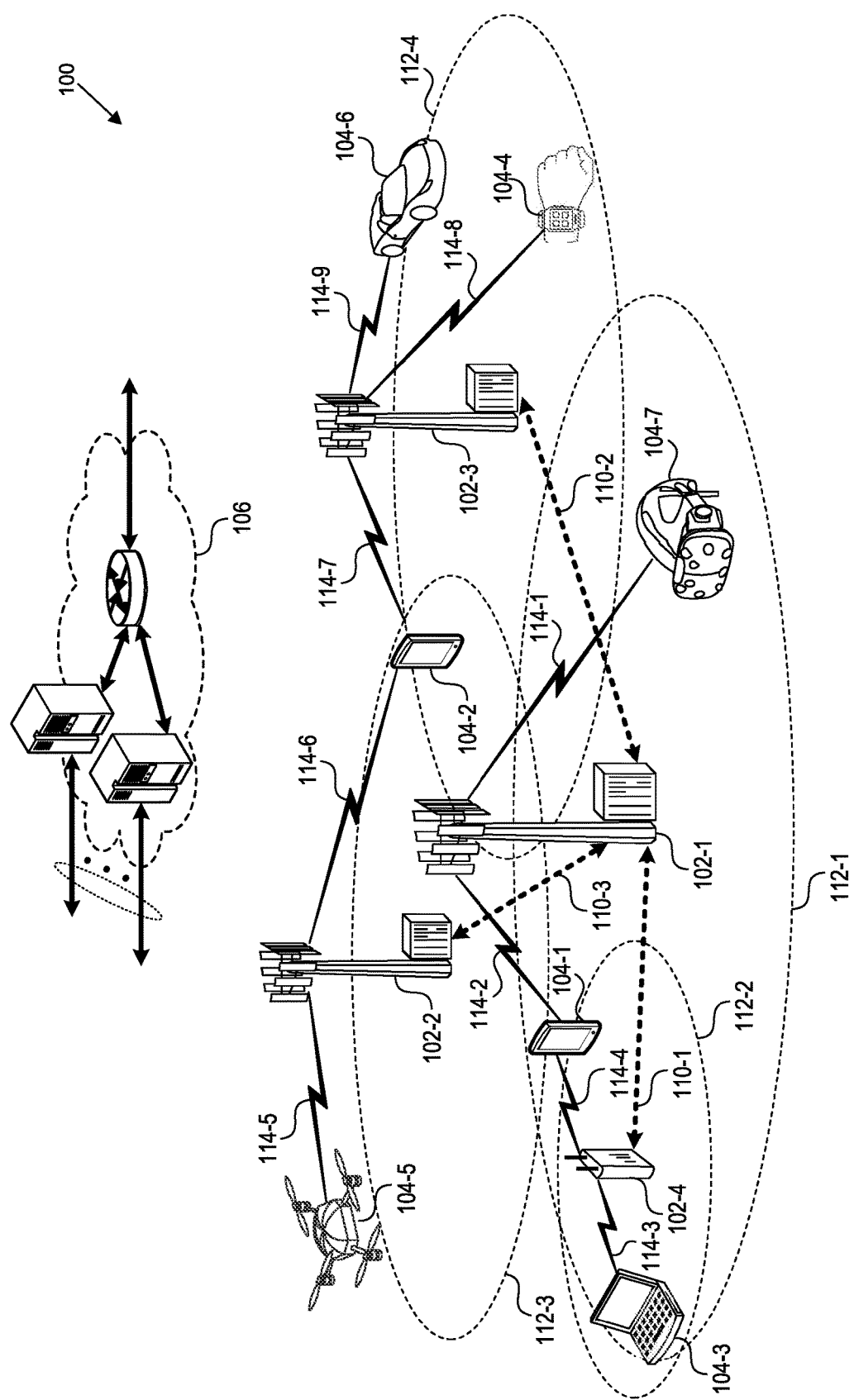
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology can use laser energy to enhance propagation paths in mobile communications. In one example, a laser emitter can generate short pulses of laser light that are emitted toward a target mobile device, particularly when the mobile device is in Line-of-Sight (LOS) of the laser emitter. When the laser emitter is mounted on a base station, the pulsed laser can clear a propagation path to a mobile device when in LOS to enhance signal propagation between the base station and the mobile device. In another example, the laser emitter can clear at least a portion of the propagation path even when the mobile device is not in LOS of the laser emitter. The pulsed laser can enhance signal propagation in at least two ways. First, laser energy can enhance ionization of the air in a communication channel over the propagation path, which improves radio propagation characteristics (e.g., reflection, diffraction, and scattering). Second, the laser energy can shock the air in a manner that lowers moister on the propagation path, again enhancing path propagation and thus network coverage.

This form of laser-based enhancement can mitigate the undesired effects on coverage caused by environmental conditions to improve signal strength. Moreover, laser emitters can be mounted on buildings, trees, or other structures that normally act as obstructions that cause propagation loss. These tower-level structures can offer LOS to mobile devices in addition to or instead of using base stations for supporting laser emitters. In addition, a laser emitter can be reconfigured to compensate for changes in known or predicted environmental conditions (the time of year, etc.). For example, laser emitters can be disabled in summer and enabled in winter to clear propagation paths through clouds or other atmospheric conditions. As such, the laser-enhanced propagation paths can efficiently mitigate reflections that would otherwise decrease mobile coverage.

In addition, the disclosed technology can be deployed to expand connectivity in more sparsely populated areas (e.g., with sub-mmW coverage), especially in rural areas that have numerous LOS transmission paths, to increase performance and subscribers. For example, laser-based enhancement could be used in rural areas, where LOS is readily available from a tower to a larger area that has a lower population density. The sparsely populated areas require a cell radius that is larger than average in order to keep mobile networks affordable for subscribers. By mounting the laser emitter on the base station's antenna, the laser emitter can send short laser pulses over a larger coverage area that can include multiple network devices of the telecommunications system.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication channels.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication channels 114-1 through 114-9 (also referred to individually as "communication channel 114" or collectively as "communication channels 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication channel 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication channels 114 can transmit bidirectional communications using frequency division duplex (FDD) (e.g., using paired spectrum resources) or Time division duplex (TDD) operation (e.g., using unpaired spectrum resources). In some implementations, the communication channels 114 include LTE and/or mmW communication channels.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Laser-Based Enhancement of Propagation Paths

A laser emitter is used herein for telecommunications to mitigate path loss of communications signals, which can refer to a reduction in power density of radio signals as they propagate through the air. As used herein, a "laser emitter" refers to a device that emits light through a process of optical amplification based on the stimulated emission of electromagnetic radiation. Path loss may be due to many effects, such as free-space loss, refraction, diffraction, reflection, aperture-medium coupling loss, and absorption. Path loss is also influenced by terrain contours, environmental conditions in the propagation medium, the distance between the transmitter and the receiver, and the height and location of antennas.

A laser differs from other sources of light in that it emits light which is coherent. Spatial coherence allows a laser to be focused to a target mobile device. Spatial coherence also allows a laser beam to stay narrow over great distances. Lasers can also have high temporal coherence, which allows them to emit light with a very narrow spectrum. Alternatively, temporal coherence can be used to produce ultrashort pulses of light with a broad spectrum but durations as short as a femtosecond. Spatial (or transverse) coherence is typically expressed through the output being a narrow beam. Laser beams can be focused to very small target spots, achieving a very high irradiance, or they can have very low divergence in order to concentrate their power at a great distance. Temporal (or longitudinal) coherence implies a polarized wave at a single frequency, whose phase is correlated over a relatively great distance (the coherence length) along the beam.

In general, lasers are characterized according to their wavelength in a vacuum. Most "single wavelength" lasers produce radiation in several modes with slightly different wavelengths. Although temporal coherence implies some degree of monochromaticity, there are lasers that emit a broad spectrum of light or emit different wavelengths of light simultaneously. Some lasers are not single spatial mode and have light beams that diverge more than is required by the diffraction limit. All such devices are classified as laser emitters or simply "lasers," based on the method of producing light by stimulated emission.

The laser emitters of the disclosed technology generally use a pulsed operation of lasers, which refers to any laser not classified as continuous wave, so that the optical power appears in pulses of some duration at some repetition rate. In an example, an application requires the production of pulses having large energy. Since the pulse energy is equal to the average power divided by the repetition rate, this goal can sometimes be satisfied by lowering the rate of pulses so that more energy can be built up in between pulses. For example, a small volume of particles can be evaporated if heated in a very short time, while supplying the energy gradually would allow for the heat to be absorbed, never attaining a sufficiently high temperature at a particular point. As such, pulsed laser energy can clear propagation paths through water droplets (e.g., cloud, fog) or other particles, which would otherwise dim and scatter propagation signals. Accordingly, the path clearing capability of the disclosed technology can improve wireless communications.

Figure 2:
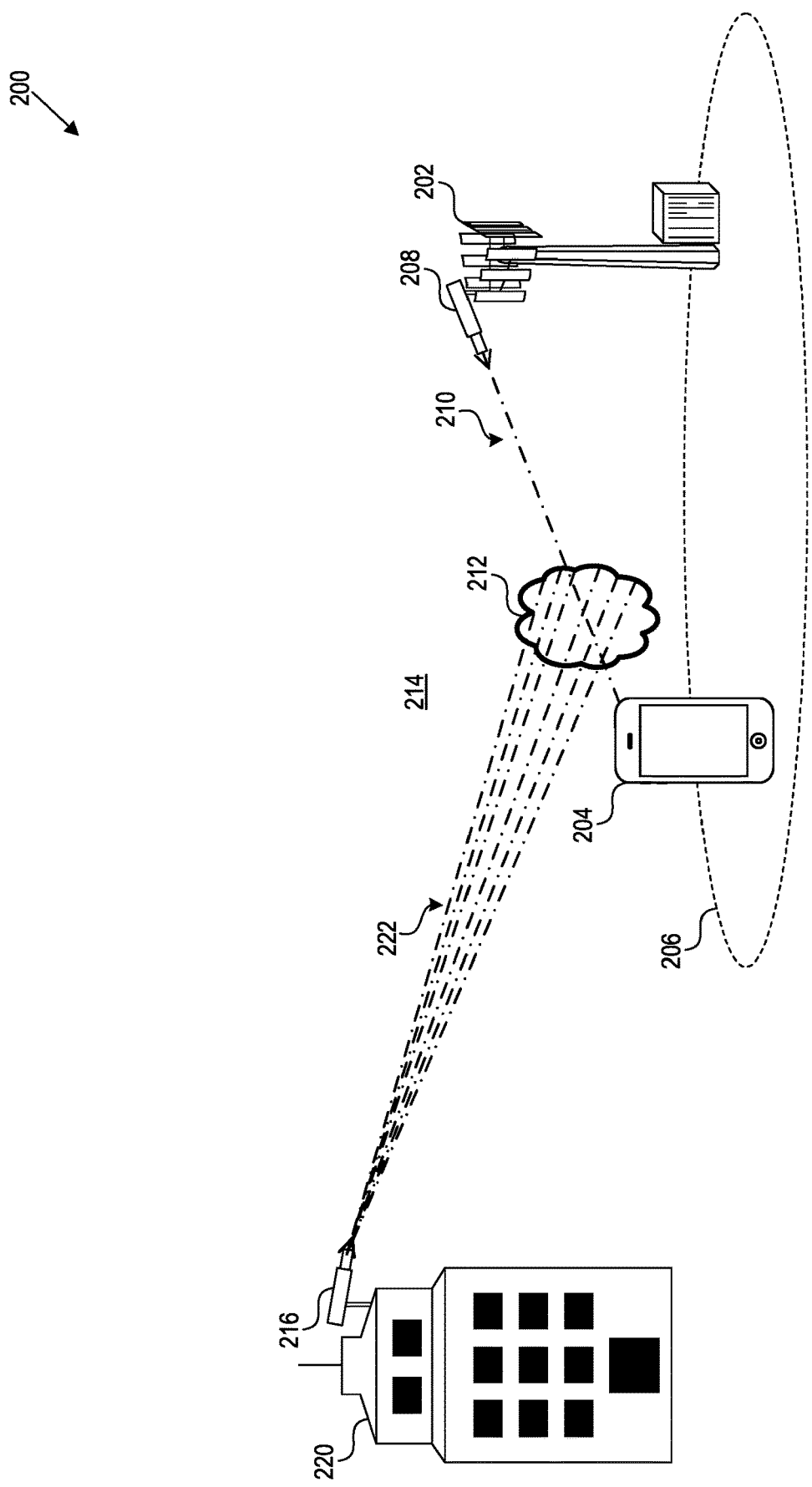
FIG. 2 illustrates a system for laser-based enhancement of path propagation in a telecommunications network.

FIG. 2 illustrates a system 200 for laser-based enhancement of path propagation in a telecommunications network. A base station 202 includes an array of antenna elements that use antenna beamforming to communicate uplink/downlink signals in a wireless communication channel to a target mobile device 204 in a coverage area 206. A laser emitter 208 is mounted on the array of antenna elements of the base station 202. The laser emitter 208 is configured to emit a pulsed laser along a laser propagation path 210 that overlaps a majority (or entirety) of a signal propagation path of the uplink/downlink signals in the wireless communication channel to the target mobile device 204. As such, the laser emitter 208 can clear the signal propagation path through an environmental condition 212 (e.g., cloud, fog, dust) in a propagation medium 214 (e.g., air) to improve signal propagation to the mobile device 204. In one non-limiting example, the laser emitter 208 is configured to emit a pulsed red-light laser of wavelengths about 800 nm, pulses around 56 fs width, and with a pulse every 8.36 picoseconds.

The system 200 also includes a laser emitter 216 that is mounted on a building 220 and configured to emit a pulsed laser over one or more laser propagation paths 222 toward the coverage area 206. The laser emitter 216 can be mounted on any structure (e.g., tower, mountain, tree, or pole) that offers a tower-level view of mobile devices in the coverage area 206. That is, the laser emitter 216 is positioned on the building 220 at about the same elevation from the ground as the laser emitter 208 mounted on the base station 202.

When a mobile device 204 is in LOS of the base station 202, the signal propagation path extends from the base station 202 to the mobile device 204, to communicate uplink/downlink signals. As such, the propagation path of the laser emitter 208 mounted on the base station 202 can overlap a majority (or entirety) of the signal propagation path from the base station 202 to the mobile device 204. In contrast, the laser emitter 216 is in LOS of the mobile device 204 but positioned such that any of the laser propagation paths 222 of the pulsed laser cannot overlap the signal propagation path between the base station 202 and the mobile device 204. As shown, the laser emitter 216 can sweep the area of the propagation medium 214 affected by the environmental condition 212 that causes signal propagation loss along the signal propagation path. In contrast, the laser emitter 208 can clear the environmental condition 212 for the signal propagation path to the mobile device 204 without needing to perform a sweep of an area.

Figure 3:
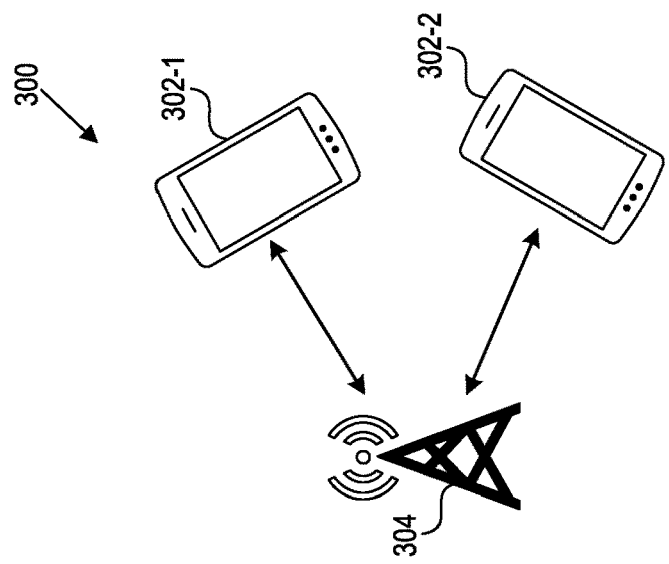
FIG. 3 illustrates laser-based enhancement for multiple mobile devices in a telecommunications network.

FIG. 3 illustrates laser-based enhancement for multiple mobile devices in a telecommunications network. The system 300 includes two mobile devices 302-1 and 302-2 that have respective wireless connections to a base station 304. The system 300 can use a pulsed laser to improve the signal propagation characteristics between the base station 304 and the mobile device 302-1 and provide accompanying improvements to the signal propagation characteristics between the base station 304 and the mobile device 302-2. For example, the mobile device 302-2 can experience a poor signal environment (e.g., low signal to interference and noise ratio (SINR)). Targeting the pulsed laser from the base station 304 to the mobile device 302-2 can improve SINR while indirectly improving the signal propagation between the base station 304 and the mobile device 302-1. That is, the needed transmit power for communications between the base station 304 and the mobile device 302-1 is reduced, which reduces interference seen at the mobile devices 302-1 and 302-2.

In another example, the mobile device 302-2 can be at a location that prohibits laser-based enhancement to the signal propagation path from the base station 304 to the mobile device 302-2. For example, there could be objects blocking LOS between the base station 304 and the mobile device 302-2. The base station 304 can still improve SINR for mobile device 302-2 by using laser-based enhancement for the signal propagation path between the base station 304 and the mobile device 302-1, allowing both the base station 304 and mobile device 302-1 to lower transmit power. This conserves battery power for the mobile device 302-1 but could also lower interference from mobile device 302-1 seen at the mobile device 302-2. As such, capabilities of the mobile device 302-2 are improved indirectly. This technique could also apply for co-channel interference, including UL-MIMO and for adjacent channel interference.

Figure 4:
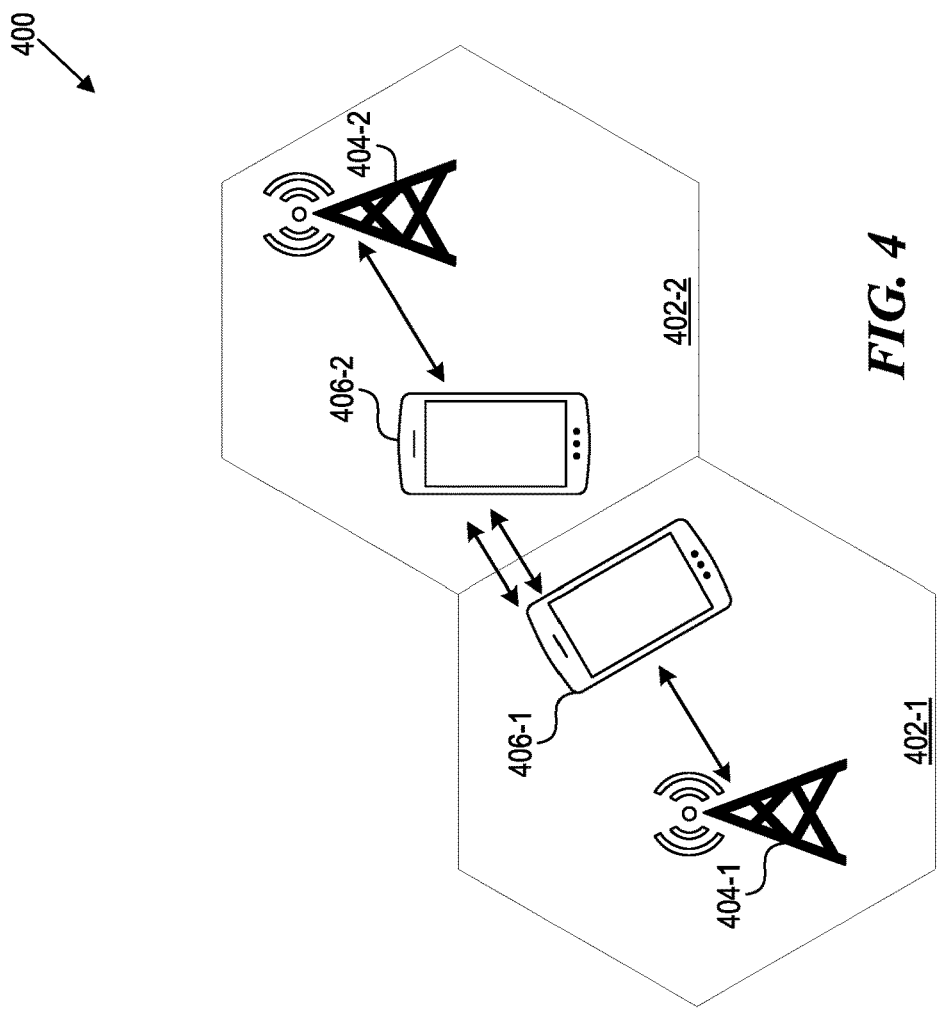
FIG. 4 illustrates laser-based enhancement for adjacent cell sites in a telecommunications network.

FIG. 4 illustrates laser-based enhancement for adjacent cell sites in a telecommunications network. As illustrated, the system 400 includes a cell 402-1 that is adjacent to a cell 402-2. The cell 402-1 has a base station 404-1 that serves a mobile device 406-1. Likewise, the cell 402-2 has a base station 404-2 that serves a mobile device 406-2. The mobile devices 406-1 and 406-2 are physically near each other at the edge of their respective cells 402-1 and 402-2. The laser-based enhancement for the cell 402-1 can improve the capabilities for the cell 402-2 and vice versa. For example, using the laser-based enhancement to improve the SINR for the cell 402-1 can conserve battery power of both the mobile device 406-1 and 406-2 due to lower interference in a manner similar to that described with respect to FIG. 3.

Figure 5:
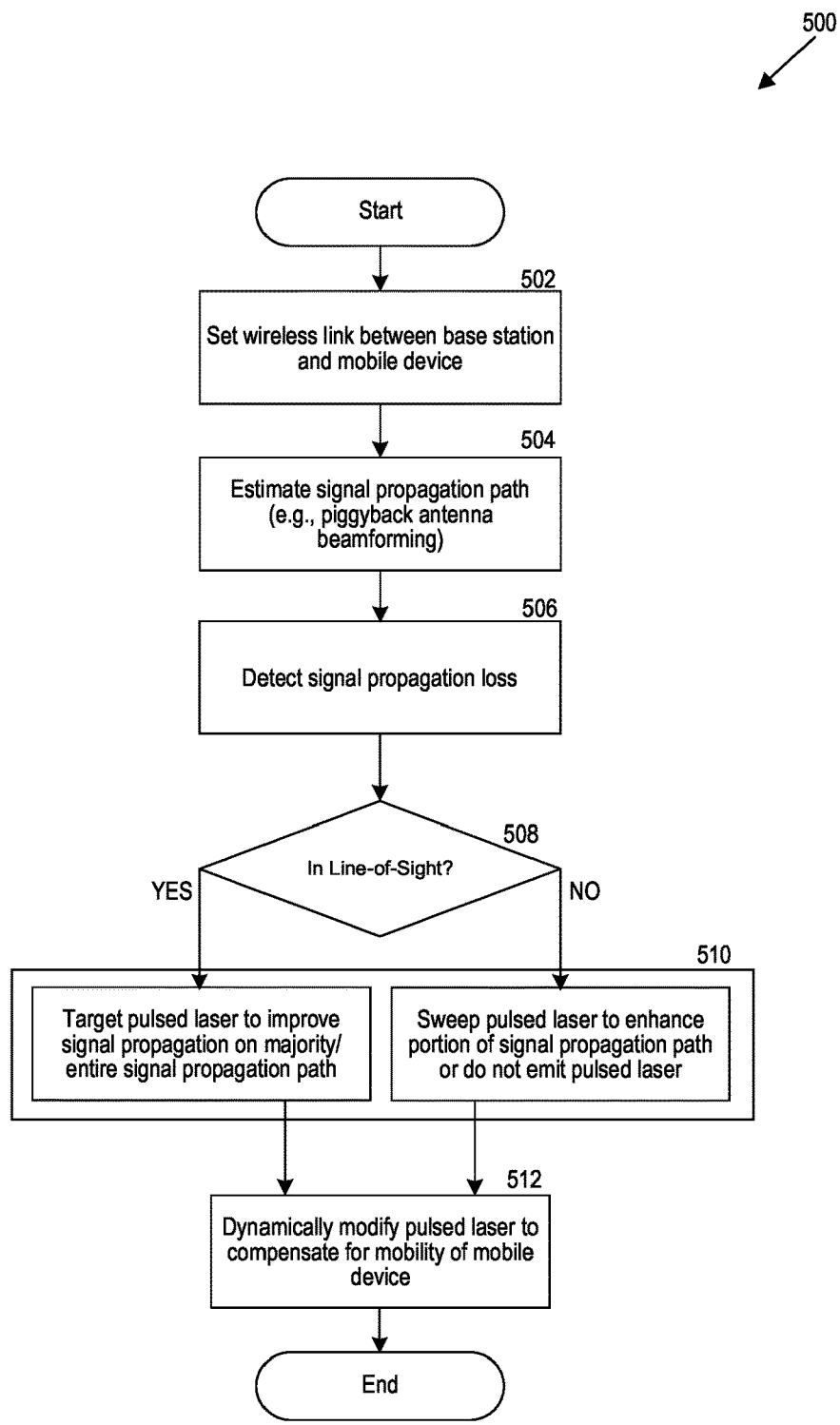
FIG. 5 is a flowchart that illustrates a process for using a pulsed laser to enhance path propagation in a telecommunications network.

FIG. 5 is a flowchart that illustrates a process for using a pulsed laser to enhance path propagation in a telecommunications network ("network"). The process 500 can be performed by a system including a base station and a laser emitter of the network. In one example, the technology can clear a signal propagation path for a millimeter wave (mmW) band on a 5G network, which requires LOS between the base station and a mobile device. The technology can improve propagation characteristics of other bands, which do not require LOS between the base station and a mobile device, by clearing at least a portion of a signal propagation path.

At 502, the system can receive a request to establish a wireless communication channel (e.g., mmW channel) between a base station of the network (e.g., 5G network) and a mobile device. The communication channel includes a signal propagation path from the base station to the mobile device. The signal propagation path has a direction and a distance from the base station to the mobile device. The direction and/or the distance of the signal propagation path can vary based on a current location of the mobile device relative to the base station.

At 504, the system can estimate the signal propagation path coincident with an antenna beam generated from a beamforming operation to communicate uplink/downlink signals between the base station and the mobile device. In other words, the system can reuse existing antenna beamforming technology to estimate the signal propagation path, which could then be enhanced with the pulsed laser to improve the propagation characteristics of the communication channel. As such, the signal propagation path varies based on a current location of the mobile device relative to the base station in accordance with the antenna beam.

At 506, the system can detect a signal propagation loss to the communication channel due to a condition of a propagation medium including the signal propagation path. In one example, the system estimates potential or actual signal propagation loss based on weather data or mobility data of a mobile device in a cell site of the base station. An example of the weather data includes a forecast of a weather condition or historical information about a past weather condition affecting the propagation medium. An example of the mobility data includes a prediction of a quantity of mobile devices in an area of the cell site based on a historical utilization of the base station. In another example, the system detects a potential signal propagation loss based on a predicted or expected environmental condition. In another example, the system detects an environmental condition causing an actual signal propagation loss. Examples of the environmental condition include a cloud, fog, humidity, moisture, smoke, dust, or other suspended small particles.

At 508, the system can determine whether the mobile device is in LOS of the laser emitter, which is configured to emit one or more pulsed lasers in a coverage area of the telecommunications network. Examples of the technology do not require LOS or even making a determination regarding whether any mobile device is in LOS of the laser emitter. For example, the laser emitter can sweep the pulsed laser over an area of the propagation medium including a portion of the signal propagation path, where the laser emitter is controlled to sweep the pulsed laser based on a schedule or a predictive model trained with historical mobility traffic data or weather data.

At 510, in response to detection of the signal propagation loss, the system can cause the laser emitter to emit a pulsed laser configured to enhance signal propagation characteristics for the communication channel. In one example, the pulsed laser has laser energy sufficient to reduce moisture in the air by ionizing or shocking the air, which acts as a propagation medium for signal propagation. The laser energy is insufficient to damage human tissue. The laser emitter can also be intermittently activated to emit the pulsed laser while the condition affecting the propagation medium persists.

In one example, the system can determine a predicted signal propagation loss to the wireless communication channel due to an environmental condition impacting the propagation medium of the signal propagation path. In response, the laser emitter is configured to mitigate the predicted signal propagation loss caused by the environmental condition impairing the propagation medium. In another example, the system detects an actual signal propagation loss to the communication channel due to the environmental condition impairing the propagation medium of the signal propagation path. In response, the pulsed laser is configured to mitigate the actual signal propagation loss caused by the environmental condition impacting the propagation medium.

The laser emitter can be configured differently depending on whether the mobile device is in LOS and whether the laser propagation path is coincident with the signal propagation path (e.g., when the laser emitter is mounted on the base station). For example, when in LOS, the pulsed laser has a laser propagation path that overlaps the signal propagation path. As such, the laser emitter can clear a majority or an entirety of the signal propagation path. When not in LOS, the laser emitter can be caused to sweep the pulsed laser through a portion of the propagation medium to clear only a portion of the signal propagation path. Alternatively, the laser emitter can stop emitting the pulsed laser when detecting non-LOS of the mobile device with the laser emitter.

At 512, the system can trigger or control the laser emitter to dynamically change the direction in which the pulsed laser is directed to maintain the enhanced signal propagation that follows a changing signal propagation path. In one implementation, the system steers the pulsed laser coincident with an antenna beam. In one example, the system predicts a next location of the mobile device different from the current location, where the next location can be predicted based on activity associated with the mobile device. As such, the laser emitter dynamically redirects the pulsed laser toward the next location of the mobile device.

The laser emitter can be triggered to activate in response to, for example, an SNR, SINR, a power need of the mobile device, or an interference caused by the mobile device on another mobile device. In one example, the system detects that a capability of a second mobile device is potentially affected by the first mobile device. In response, the laser emitter is triggered to activate the laser-based enhancement of the signal propagation path of the first mobile device. For example, two second mobile devices can be in the same cell cite or neighboring cell sites. By enhancing the signal propagation path to one mobile device, the second mobile device can experience less interference from the other mobile device because less transmit power is required for communicating. In another example, enhancing the signal propagation path of one mobile device, can help to conserve battery power of that mobile device or a neighboring mobile device because less battery power is required to transmit signals when the signal propagation path is clear and/or when there is less interference from other mobile devices.

Computer System

Figure 6:
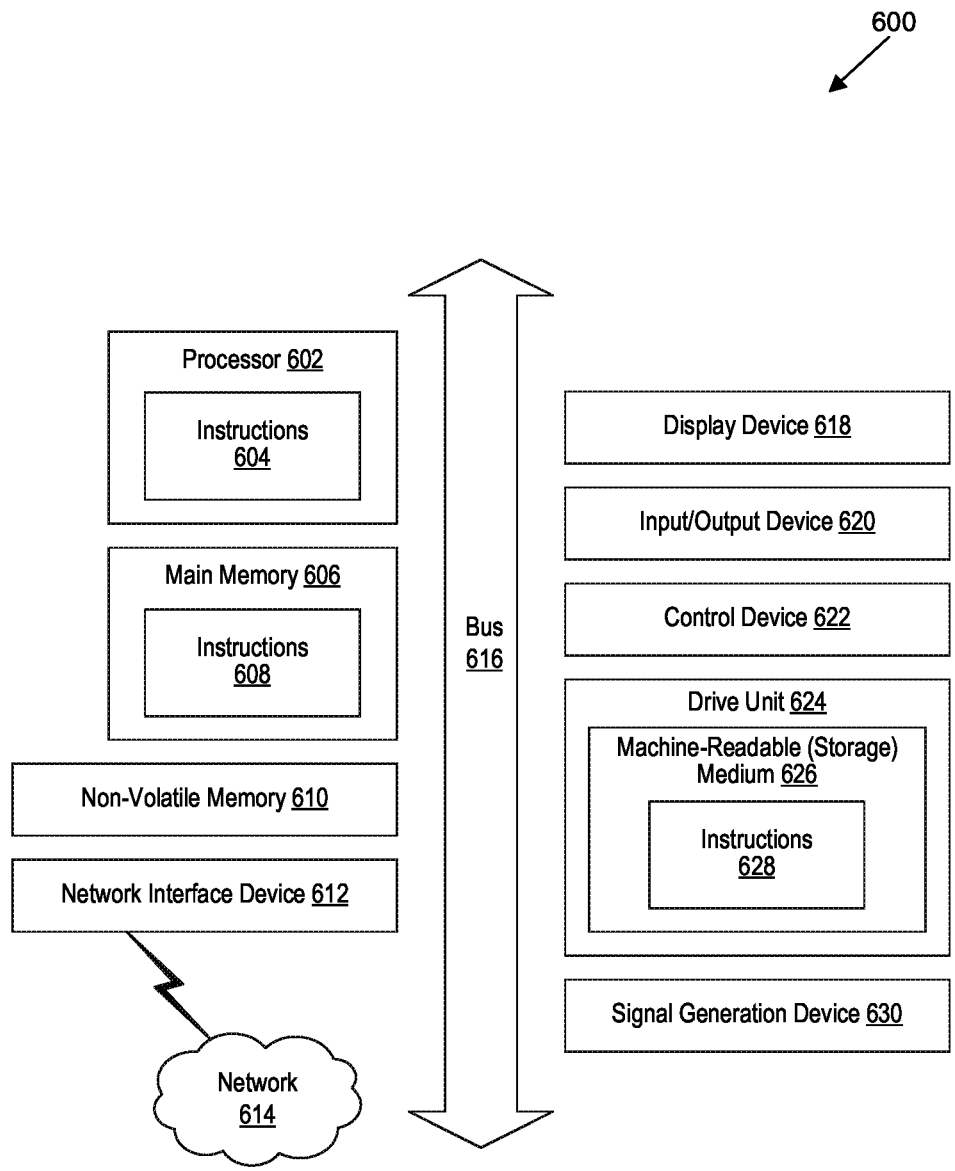
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 600. In some implementation, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication channels.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-readable storage medium, excluding transitory signals and carrying instructions, which, when executed by at least one data processor of a system, cause the system to:
    establish a millimeter wave (mmW) communication channel on a 5G telecommunications network between a base station and a mobile device,
        wherein the mmW communication channel includes a signal propagation path from the base station to the mobile device;
    estimate the signal propagation path in accordance with an antenna beam generated based on a beamforming operation to communicate uplink/downlink signals between the base station and the mobile device,
   wherein the signal propagation path varies based on a current location of the mobile device relative to the base station and in accordance with the antenna beam;
detect a signal propagation loss to the mmW communication channel due to a condition of a propagation medium including the signal propagation path;
determine whether the mobile device is in Line-of-Sight (LOS) of a laser emitter,
   wherein the laser emitter is configured to emit a laser in a coverage area of the 5G telecommunications network; and
in response to detection of the signal propagation loss, cause the laser emitter to emit a pulsed laser configured to enhance signal propagation for the mmW communication channel by mitigating the signal propagation loss relative to the signal propagation path,
   wherein the pulsed laser has a propagation path overlapping the signal propagation path when the mobile device is in LOS of the laser emitter.

2. The computer-readable storage medium of claim 1, wherein the system is further caused to:
steer the pulsed laser to track the antenna beam.

3. The computer-readable storage medium of claim 1, wherein the system is further caused to:
cause the laser emitter to emit the pulsed laser through a portion of the signal propagation path when the mobile device is in non-SOL of the laser emitter.

4. The computer-readable storage medium of claim 1, wherein to detect the signal propagation loss of the mmW communication channel comprises causing the system to:
detect an environmental condition causing an actual signal propagation loss,
   wherein the environmental condition includes fog, humidity, moisture, smoke, dust, or particles.

5. The computer-readable storage medium of claim 1, wherein to detect the signal propagation loss of the mmW communication channel comprises causing the system to:
detect a potential signal propagation loss based on a predicted or expected environmental condition.

6. The computer-readable storage medium of claim 1, wherein the system is further caused to:
cause the laser emitter to sweep the pulsed laser over an area of the propagation medium including a portion of the signal propagation path,
   wherein the laser emitter is controlled to sweep the pulsed laser based on a schedule or a predictive model trained with historical mobility traffic data or weather data.

7. The computer-readable storage medium of claim 1, wherein the mobile device is a first mobile device, and wherein the system is further caused to:
detect that a capability of a second mobile device is potentially affected by the first mobile device; and
in response to detection that the capability of the second mobile device is potentially affected by the first mobile device, trigger activation of the laser emitter to enhance the signal propagation path of the first mobile device.

8. The computer-readable storage medium of claim 1, wherein the system is further caused to:
trigger activation of the laser emitter based on:
   a Signal-to-Noise Ratio (SNR) of the mmW communication channel, battery power of the mobile device, or
   interference caused between the mobile device and another mobile device.

9. The computer-readable storage medium of claim 1, wherein the system is further caused to:
predict a next location of the mobile device different from the current location of the mobile device,
   wherein the next location of the mobile device is predicted based on activity associated with the mobile device; and
cause the laser emitter to dynamically redirect the pulsed laser toward the next location of the mobile device.

10. The computer-readable storage medium of claim 1, wherein the system is further caused to:
cause the laser emitter to terminate emitting the pulsed laser for the mmW communication channel upon detecting non-LOS of the mobile device with the laser emitter.

11. The computer-readable storage medium of claim 1, wherein to detect the signal propagation loss comprises causing the system to:
estimate potential or actual signal propagation loss based on a weather data or mobility data of wireless device in a cell site of the base station.

12. The computer-readable storage medium of claim 1:
wherein the pulsed laser has laser energy sufficient to reduce moisture by ionizing or shock the air in the signal propagation path and insufficient to damage human tissue.

13. The computer-readable storage medium of claim 1, wherein the laser emitter is mounted on the base station of the 5G telecommunications network.

14. The computer-readable storage medium of claim 1:
wherein the laser emitter is mounted on a structure other than the base station, and
wherein the laser emitter is mounted on the structure at an elevation equal to or greater than that of an antenna disposed on the base station.

15. A base station of a telecommunications network, the base station comprising:
an array of antenna elements configured to communicate uplink and downlink signals in a coverage area of the base station;
a laser emitter disposed at the array of antenna elements and configured to emit pulsed laser light toward the coverage area of the base station;
at least one hardware processor; and
at least one non-transitory memory storing instructions, which, when executed by the at least one hardware processor, cause the base station to:
   receive a request to establish a wireless communication channel between the base station and a mobile device;
   predict a signal propagation path from the base station to the mobile device,
      wherein the signal propagation path varies based on a current location of the mobile device relative to the base station;
   determine whether at least a portion of the signal propagation path is in Line-of-Sight (LOS) of the laser emitter;
   estimate a signal propagation loss of the wireless communication channel caused by an environmental condition impacting a propagation medium of the signal propagation path; and cause the laser emitter to emit a pulsed laser configured to mitigate the estimated signal propagation loss caused by the environmental condition impacting the propagation medium.

16. The base station of claim 15, wherein to estimate the signal propagation loss of the wireless communication channel comprises causing the base station to:
determine a predicted signal propagation loss to the wireless communication channel due to the environmental condition impacting the propagation medium of the signal propagation path,
wherein the laser emitter is configured to mitigate the predicted signal propagation loss caused by the environmental condition impacting the propagation medium.

17. The base station of claim 15, wherein to estimate the signal propagation loss of the wireless communication channel comprises causing the base station to:
detect an actual signal propagation loss to the wireless communication channel due to the environmental condition impacting the propagation medium of the signal propagation path,
wherein the pulsed laser is configured to mitigate the actual signal propagation loss caused by the environmental condition impacting the propagation medium.

18. A telecommunications system comprising:
a laser emitter configured to emit laser light toward a coverage area;
a base station;
at least one hardware processor; and
at least one non-transitory memory storing instructions, which, when executed by the at least one hardware processor, cause the telecommunications system to:
estimate a potential signal propagation loss affecting a wireless device in a cell site of the base station based on weather data or mobility data;
predict a signal propagation path in a propagation medium affected by the potential signal propagation loss,
wherein the signal propagation path extends from the base station to the wireless device, and
wherein the signal propagation path varies in the propagation medium based on a current location of the wireless device relative to the base station;
estimate that at least a portion of the signal propagation path will be in Line-of-Sight (LOS) of the laser emitter; and
cause the laser emitter to emit a pulsed laser configured to enhance the signal propagation path between the base station and the wireless device.

19. The telecommunications system of claim 18, wherein the weather data comprises a forecast of a weather condition or historical information about a past weather condition affecting the propagation medium.

20. The telecommunications system of claim 18, wherein the mobility data comprises a prediction of a quantity of wireless devices in an area of the cell site based on a historical utilization of the base station.

* * * * *